United States Patent [19]

Sigfridsson et al.

[11] 4,106,538
[45] Aug. 15, 1978

[54] TRANSLATORY FEED OF LUMBER WORKPIECES FROM AN ORIENTING STATION THROUGH AN EDGE TRIMMING STATION

[75] Inventors: F.S. Meinrad Sigfridsson, Huskvarna; K. Sigvard Jansson, Tyresö, both of Sweden

[73] Assignee: Saab-Scania Aktiebolag, Linkoping, Sweden

[21] Appl. No.: 784,289

[22] Filed: Apr. 4, 1977

[30] Foreign Application Priority Data

Apr. 7, 1976 [SE] Sweden ............................. 7604057

[51] Int. Cl.² ...................... B27M 1/08; B27B 31/00; B27C 1/12
[52] U.S. Cl. ........................... 144/309 R; 144/242 R; 144/242 C; 144/245 A; 198/617; 198/728
[58] Field of Search ........... 144/245 R, 245 A, 245 B, 144/245 D, 309 R, 242 R, 242 H, 242 F, 242 A, 242 C, 246; 198/617, 721, 728, 692, 809, 836

[56] References Cited

U.S. PATENT DOCUMENTS

| | | | |
|---|---|---|---|
| 2,540,004 | 1/1951 | McFall | 144/242 R |
| 3,313,329 | 4/1967 | Mitten | 144/309 R X |
| 3,970,128 | 7/1976 | Kohlberg | 144/245 A |

Primary Examiner—Travis S. McGehee
Attorney, Agent, or Firm—Ira Milton Jones & Associates

[57] ABSTRACT

Strictly translatory substantially lengthwise horizontal motion is imparted to an elongated workpiece such as a cant having top and bottom face surfaces, at least one of which is flat, to feed the workpiece from an orienting station towards a trimming station at which straight, parallel longitudinal side surfaces are formed on the workpiece that are perpendicular to said flat face surface. For such translatory motion, driving dogs engage one face surface at longitudinally spaced portions of a narrow zone thereof which is spaced substantially equal distances from its longitudinal edges; the driving dogs are confined to linear motion in the feed direction; and the other face surface is engaged by horizontal freely revolving rollers extending transversely to the feed direction at intervals therealong. At the orienting station the oriented workpiece is clampwise engaged by the rollers and dogs by effecting relative vertically converging motion between them.

8 Claims, 8 Drawing Figures

TRANSLATORY FEED OF LUMBER WORKPIECES FROM AN ORIENTING STATION THROUGH AN EDGE TRIMMING STATION

This invention relates to the trimming of cants, waney planks and similar elongated workpieces to provide them with straight, parallel longitudinal edge surfaces; and the invention is more particularly concerned with a method and means for effecting translatory substantially lengthwise horizontal motion of such a workpiece from an orienting station, at which the workpiece is established in a desired orientation, towards a trimming station at which portions are trimmed off of the workpiece along one or both sides thereof to provide it with the desired longitudinal edge surfaces.

BACKGROUND OF THE INVENTION

At one stage in the production of planks and boards from logs, the lumber workpieces are in the form of cants or waney planks having substantially flat and parallel top and bottom face surfaces and more or less irregular longitudinally extending side surfaces. Because each workpiece is to be converted into one or more boards having finished side surfaces that are straight, parallel and accurately perpendicular to the already-finished top and bottom surfaces, a certain amount of material must be removed in an edge trimming operation by which the side surfaces are finished.

In the interests of economy, the edge trimming cuts are so planned that the least possible amount of material will be wasted. Usually the planning for the trimming operation is accomplished as the workpiece moves to and arrives at an orienting station. For such planning, the workpiece has its narrower face surface uppermost, so that an estimate can be made of the orientation and spacing of the edging cuts that will enable the most profitable standard size board or plank to be produced from the workpiece. The planning may be done by a skilled operator, or may be done automatically by means of apparatus such as is disclosed in U.S. Pat. Nos. 3,886,372, 3,963,938 and 3,970,128. With automatic apparatus, the workpiece is passed under a scanning device that is associated with a computer, and, on the basis of the geometry of the top face surface of the workpiece, as ascertained by the scanning apparatus, the computer produces outputs which control the adjustment of orientation instrumentalities. In the absence of automatic scanning and orienting apparatus, a skilled operator orients the workpiece on the basis of his observation of the geometry of the finished top surface and his estimate of the edge finishing cuts that will result in the optimum finished product.

Whether the orientation is performed by automatic apparatus or by a skilled person, the result of the orientation process is that a relationship is established between the workpiece and the side edge trimming instrumentalities such that the desired trimming cuts can be made on it by feeding it from the orienting station through the trimming station with a purely translatory motion, such motion of course being in a horizontal direction and substantially lengthwise of the workpiece.

It will be evident that the calculation and planning which culminates in positioning of the workpiece at the orienting station will be useful only insofar as the workpiece is prevented from changing its orientation as it is fed from the orienting station through the trimming station. Heretofore, workpieces have been fed to the trimming station by means of a roller conveyor such as is disclosed in the above mentioned U.S. Pat. Nos. 3,963,938 and 3,970,128. Such a conveyor comprised a number of identical cylindrical rollers having their axes extending horizontally and transversely to the direction of feed. The rollers were rotatably driven in unison and were arranged at close enough intervals along the path of feed so that each workpiece could always rest on a plurality of rollers, to be advanced by their rotation. To prevent slippage between the rollers and the workpiece, freely rotatable hold-down rollers, mounted at intervals along the feed path, engaged against the top surface of the workpiece as it moved along.

It has been found that a roller conveyor could not be relied upon to effect a purely translatory motion of the workpiece. At the trimming station, the trimming saws or cutters exerted lateral forces on the workpiece, and the roller conveyor allowed it to be shifted out of its desired orientation in response to such forces, the shifting often continuing and becoming progressively worse as the piece advanced through the trimming station. If the top surface of the workpiece was not parallel to its bottom surface, the hold-down force exerted by the holding rollers could be concentrated along one longitudinal edge of the workpiece, and the workpiece could be laterally shifted even before it reached the trimming station. Other circumstances such as warped or crooked workpieces could also cause lateral shifting whereby the trimming was not accomplished along the calculated cutting lines.

Any displacement of the trimming cuts from their desired locations or orientations, even by a few millimeters, could result in a board or plank which was totally useless or which had to be cut down to a less profitable size, either by shortening it or by reducing its width.

At least in the case where orientation of workpieces is performed by means of automatic apparatus comprising a scanner and a computer, the problem of feeding the workpieces to the trimming station with a purely translatory substantially lengthwise motion is complicated by the necessity for moving each workpiece to the orienting station in a direction transverse to its length and bringing it up against stops at the orienting station that engage its leading side edge at two points that are spaced from one another along its length. Under control of the computer, the stops are adjustable in directions transverse to the length of the workpiece, and the positions to which they are adjusted determine the orientation of the workpiece at the orienting station. The workpiece must of course be transported to the orienting station by means of a conveyor or the like which assures engagement of the workpiece against the orienting stops but does not continue to apply substantial driving force to the workpiece after it is arrested by the orienting stops.

It will be apparent that the means employed for effecting translatory substantially lengthwise feeding movement of workpieces from the orienting station to the trimming station must bring the workpiece into such translatory motion from a complete stop without causing or permitting any change in the orientation of the workpiece, but nevertheless must not interfere with lateral movement of the workpieces into the orienting station, nor with adjusting movements of the orienting stops, nor with proper engagement of each workpiece against the orienting stops.

SUMMARY OF THE INVENTION

The general object of the present invention is to provide a method and means for transporting an elongated workpiece of the character described in a horizontal direction substantially lengthwise of the workpiece, from an orienting station through a trimming station, and to effect such transport with a purely translatory motion of the workpiece so that an orientation established for it at the orienting station will be maintained until it has progressed through the trimming station.

A more specific object of this invention is to provide a method and means for effecting purely translatory motion of successive workpieces from an orienting station to a trimming station, with each workpiece moving substantially lengthwise and horizontally and effectively restrained against any lateral motion that would displace it from an orientation established for it at the orienting station.

It is also a specific object of this invention to provide a method and means for successively advancing each of a succession of cants, waney boards or similar workpieces from an orienting station towards a trimming station with a purely translatory substantially lengthwise horizontal motion, without interfering with lateral substantially translatory motion of a following workpiece into the orienting station, nor with the adjustment or the functioning of orienting stops at the orienting station that arrest the lateral motion of the workpieces to establish them in desired orientations.

Another specific object of the invention is to provide a method and means for translatingly feeding workpieces individually towards a trimming station from an orienting station at which each workpiece is brought to a full stop in a desired orientation, wherein the driving means for propelling the workpieces can have continuous motion in the feeding direction and can be so engaged with each workpiece as to maintain the workpiece in exactly the orientation established for it at the orienting station.

From a method standpoint the objects of the invention are achieved with an elongated workpiece having top and bottom face surfaces, at least one of which is flat, and which has been established in a desired orientation, by engaging driving means against one of said face surfaces at portions of said face surface which are confined to a narrow zone spaced substantially equal distances from both longitudinal edges of said face surfaces; applying vertical force to the opposite face surface of the workpiece, across at least a major portion of the width thereof at each of a plurality of locations spaced at intervals along its length, such force being applied by force applying means which engage the workpiece in a manner to maintain the workpiece in secure engagement with said driving means and to leave the workpiece free for horizontal movement relative to said force applying means; effecting relative vertical translatory motion between said driving means and said force applying means to engage them clampwise with the workpiece and in a manner to engage the driving means with the workpiece no earlier than it is engaged by the force applying means; and while the driving means is engaged with the workpiece, confining said driving means to linear motion in a horizontal feed direction.

From an apparatus standpoint the objects of the invention are achieved with the structural combination comprising: supporting means at an orienting station, providing upwardly facing surface areas upon which can rest an elongated workpiece having opposite top and bottom surfaces, at least the bottom one of which is flat; endless drive means having a straight stretch extending horizontally through said orienting station and to a trimming station; workpiece engaging means on said endless drive means having small extent in the horizontal direction transverse to said stretch, said stretch and said workpiece engaging means being so arranged that the bottom surface of a workpiece at said orienting station can be engaged by workpiece engaging means on said stretch at locations that are in a narrow longitudinally extending zone of said surface which is spaced substantially equal distances from its longitudinal edges; vertical force applying means engageable with the top surface of a workpiece across at least a major portion of its width at each of a plurality of locations spaced at intervals along its length, and by which the workpiece can be confined against the workpiece engaging means without being restrained against motion in the direction of said stretch, said vertical force applying means preferably comprising rollers that are freely rotatable about horizontal axes which are transverse to said stretch and spaced from one another along the same; means for effecting relative vertical motion between said supporting means and said stretch of the endless drive means, for bringing the workpiece engaging means into engagement with the bottom face surface of a workpiece at said orienting station through a slot between said surface areas; and means for effecting relative vertical movement between said stretch and said vertical force applying means to bring them into clamping engagement with a workpiece at said orienting station substantially simultaneously with removal of support from the workpiece by said supporting surface.

With these observations and objectives in mind, the manner in which the invention achieves it purpose will be appreciated from the following description and the accompanying drawings, which exemplify the invention, it being understood that changes may be made in the specific apparatus disclosed herein without departing from the essentials of the invention set forth in the appended claims The accompanying drawings illustrate two complete examples of the embodiments of the invention constructed according to the best modes so far devised for the practical application of the principles thereof.

DESCRIPTION OF THE PREFERRED EMBODIMENTS

Referring now to the accompanying drawings, the numeral 1 designates generally a workpiece transporting apparatus by which successive elongated workpieces are fed from an orienting station, described below, to an edging station 3. The workpieces to be fed to the edging station may be cants, which have flat and parallel top and bottom face surfaces and longitudinally extending side surfaces that diverge downwardly; or they may be waney planks or boards having flat and parallel top and bottom face surfaces and more or less irregular longitudinal side surfaces; or they may be so-called slabs which are flat on only their bottom surfaces and have top surfaces which are more or less rounded so that they tend to be segment-shaped in cross-section. In the event slabs are being processed, the trimming station may include a so-called top head cutter (not shown) that cuts down the top surface to finish it flat and parallel to the bottom one. In any case, the trimming station comprises at least two cutters, here illustrated as circular saw blades 6, by which the workpiece is provided with straight, parallel side edge surfaces that are perpendicular to its flat bottom surface.

As explained above, the workpieces are fed through the trimming station substantially lengthwise, in an orientation that is established for them at the orienting station. The orienting station is defined by plates or other supporting means providing two coplanar upwardly facing flat surfaces 11, 12, separated by a slot 13 which is substantially narrower than the narrowest workpiece to be handled. The two supporting surfaces 11, 12, are elongated in the direction that the workpieces travel in being fed to the trimming station, and the slot 13 extends in that feed direction.

Successive workpieces are transported to the orienting station along a path lateral to the feed direction, each workpiece moving along that path transversely to its length. Such transport of the workpieces to the orienting station is accomplished by means of a conveyor 2 that can comprise a group of endless chains having coplanar horizontal and parallel upper stretches 4 across which the workpieces lie. The several chains of the conveyor 2 are of course driven in unison, as by having their respective driving sprockets 7 secured to a common shaft.

The workpieces may be manually oriented at the orienting station by a skilled operator who usually inspects the upper surface of each workpiece and orients it for the optimum trimming cuts with the aid of aligning marks delineated at the station.

In the apparatus here illustrated, orientation can be accomplished automatically, and for that purpose each workpiece passes under a known scanning device (not shown) in the course of being transported to the orienting station on the chain conveyor 2. The scanning device is located at a scanning station which comprises a number of scanning stops 5, one adjacent to each of the chain stretches 4. The scanning stops are normally in inoperative positions below the upper stretches 4 of the conveyor 2, so that a workpiece on the conveyor can ride over them; but as the workpiece approaches the scanning station, two of the scanning stops 5 are raised to arrest the workpiece and confine it against continued motion with the chain conveyor while the scanning device performs its measuring operation.

It will be understood that workpieces being transported through the scanning station and to the orienting station are of varying lengths. However, one end of every workpiece lies on a line parallel to the direction of transport, which line can be defined by a suitable guide means (not shown) and can be assumed to be somewhat to the right of the chain stretch 4 that is farthest to the right in FIG. 1. It will also be understood that only two of the scanning stops 5 will ordinarily be raised to workpiece arresting positions, the others remaining in their inoperative positions. The two stops 5 to be raised are selected on the basis of a measurement of the length of the workpiece, made before it reaches the scanning station, and are those which are nearest the opposite ends of the workpiece and inwardly thereof. The two raised scanning stops 5 cooperate to define a datum line on the apparatus and a reference line on the workpiece, both of which lines are employed for scanning and orienting purposes as explained in U.S. Pat. No. 3,970,128.

Upon completion of the scanning operation, the two stops 5 that have arrested the workpiece are lowered to their inoperative positions, allowing the chain stretches 4 to resume transport of the workpiece and carry it to the orienting station.

At the orienting station there are a number of orienting stops 15, one for each scanning stop 5, each orienting stop being aligned with its scanning stop in the direction of the chain stretches 4. Each orienting stop 15 is adjustable under the control of the computer in directions towards and from its scanning stop. For such adjustment each orienting stop can be guided in a slot 16 in the plate that provides the supporting surface 12, and can be actuated by a hydraulic servo device 17 that receives control inputs from the computer. For each workpiece, only those two orienting stops 15 will be adjusted that are aligned with the two scanning stops 5 that arrested the same workpiece at the scanning station, the other orienting stops remaining in their inoperative positions (shown in full lines in FIG. 2), in which they are farthest from the conveyor 2.

It will be evident that as the workpiece is moved transversely to its length to bring its leading edge into engagement with the two adjusted orienting stops 15, its arrest by those stops will dispose it in the orientation determined to be optimum for its feeding translation through the trimming station 3. It will be understood that the blades 6 or other cutters at the trimming station can be adjustable in directions transverse to the path of trimming feed, likewise under control of the computer and in coordination with adjustments of the orienting stops 15.

Figure 2:
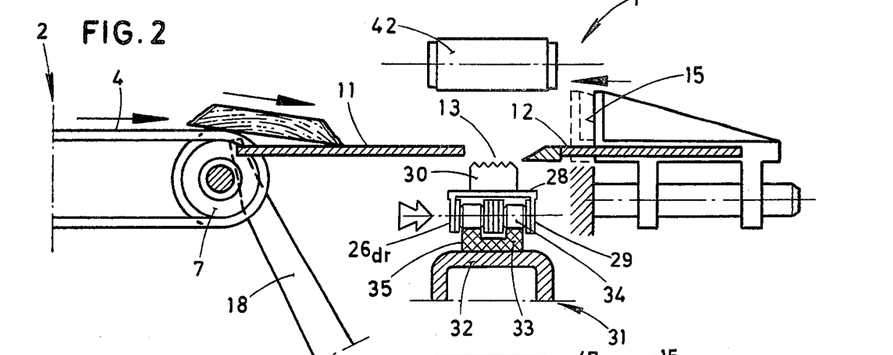
FIGS. 2–5 are fragmentary views in cross-section, which can be regarded as taken at any arbitrary location along the length of the apparatus shown in FIG. 1, and which, respectively, show successive steps in the operation of the apparatus.

To provide for transfer of each workpiece from the chain conveyor 2 to the supporting surface 11 at the orienting station, the straight stretches 4 of the conveyor chains have their upper surfaces at a level slightly above that of the surface 11, as best seen in FIG. 2. A workpiece arriving at the ends of the chain stretches 4, where those stretches curve around the sprockets 7, is thus smoothly transferred to the supporting surface 11. To accommodate the sprockets 7, a small recess 14 can be formed for each in the outer edge of the plate that provides the supporting surface 11.

Figure 3:
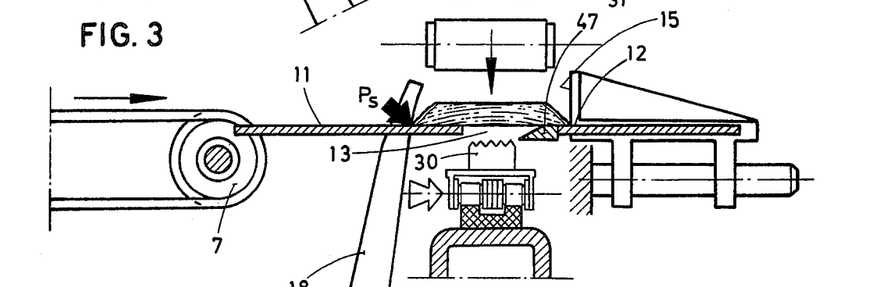

To move the workpiece across the supporting surfaces 11 and 12 and into engagement with the adjusted orienting stops, the apparatus is provided with drive arms 18, located at intervals along the direction of trimming feed and swingable about a common axis located a distance below the coplanar surfaces 11, 12 and near a vertical plane along the slot 13. The upper end portions of these arms 18 move in narrow slits 20 in the plate that provides the supporting surface 11, which slits of course extend parallel to the chain stretches 4. In a starting position of each arm 18, illustrated in FIG. 2, its upper end portion is located below and forwardly of the zone in which a workpiece moves off of the conveyor 2 and onto the supporting surface 11, so as not to interfere with such movement of the workpiece. Swinging of the arms 18 is synchronized with deposit of each workpiece completely onto the supporting surface 11. Two of the arms 18 swing away from their starting positions in unison, engaging the trailing lateral edge of a workpiece on the supporting surface 11 and, as shown in FIG. 3, exerting a force $P_s$ on the workpiece that carries it across the surface 11 and the slot 13 and into orienting engagement with the adjusted orienting stops 15. The two arms 18 that effect this propulsion of the workpiece into engagement with the orienting stops are those nearest the opposite ends of the workpiece and inwardly. thereof, so that the arms 18 impart to the workpiece substantially a continuation of the translatory motion transverse to its length that it had on the chain conveyor 2. The plate that defines the supporting surface 12 has a chamfer or bevel 47 on its edge that extends along the slot 13, to prevent the leading edge of the workpiece from catching on that slot edge as the workpiece crosses the slot.

Figure 6:
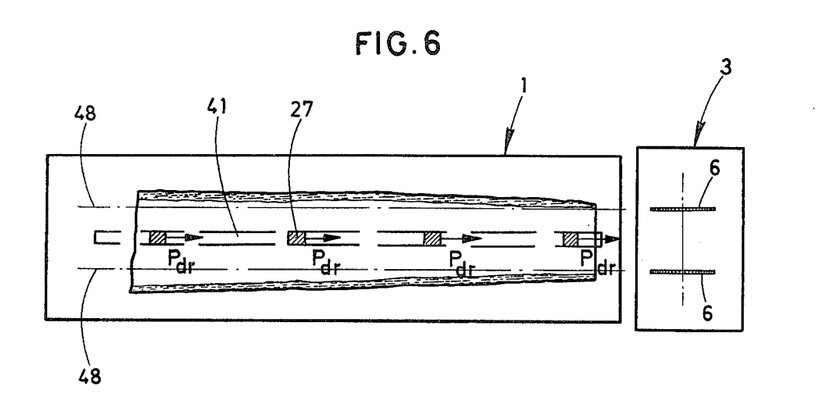
FIG. 6 is a more or less diagrammatic plan view looking down on a workpiece being advanced from the orienting station to the trimming station by the apparatus shown in FIG. 1.

The arms 18 are actuated, as by means of a pneumatic cylinder 19, in such a manner that they exert only a limited force upon the workpiece, sufficient to engage it firmly against the adjusted orienting stops 15 but not so great as to cooperate with those stops in crushing it. As illustrated in FIGS. 3 and 6, and for reasons which will appear as the description proceeds, the orienting stops 15 which engage the workpiece are so adjusted that they arrest the workpiece with its longitudinal centerline substantially on the centerline of the slot 13.

If the scanning and computing apparatus is out of order, or if the workpieces are of such quality that accurate orientation based on measuring and assessment is not justified, the workpieces can be established in adequately satisfactory orientations by means of two or more orienting arms 21 at the orienting station, each arranged opposite to one of the orienting propulsion arms 18. Each of the orienting arms 21 has a connection with a pneumatic cylinder or other actuator 19 for its propulsion arm 18 whereby it is caused to swing simultaneously with its propulsion arm 18 but in the opposite direction. Two sets of the arms 18, 21 would normally engage the trailing and leading edges, respectively, of each workpiece, cooperating to establish its longitudinal centerline substantially in coincidence with the longitudinal centerline of the slot 13.

Figure 4:
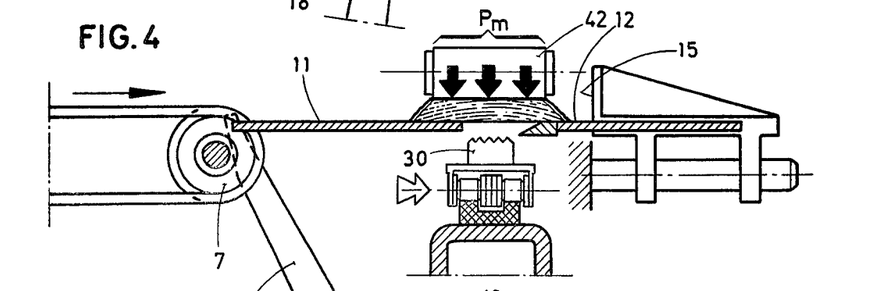

Once a workpiece is oriented by any of the methods or means described above, the propulsion arms 18 are swung back to their starting positions as shown in FIG. 4 and the orienting stops 15 or orienting arms 21 are moved in the direction away from the conveyor 2 to positions well clear of the workpiece, and the workpiece rests on the supporting surfaces 11, 12 properly oriented for feeding translation to the trimming station and ready to be so advanced to that station.

Figure 5:
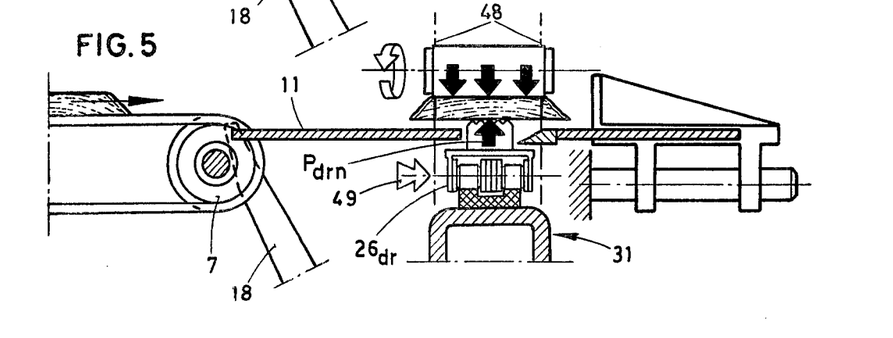

In general, by the method of this invention, performed as illustrated in FIGS. 3-5, driving elements (dogs 27, as shown) are engaged against a face surface of the workpiece (the bottom surface, as shown), said driving elements contacting only localized portions if said face surface that are confined to a narrow zone substantially along its longitudinal centerline, and said driving elements being so engaged with the workpiece that they make no movement relative to it as long as the workpiece is undergoing its translatory feeding motion; the driving elements are constrained to rectilinear motion in the feeding direction (by guide rail 33, as shown); and force is applied to the opposite face surface of the workpiece (the top surface, as shown) by force applying means (rollers 42, as shown) arranged for engaging said opposite face surface across a major portion of its width at each of a plurality of locations spaced along its length said force being applied in the direction to maintain the workpiece engaged with the driving elements but in a manner to permit relative motion between the workpiece and the force applying means in directions parallel to said face surfaces. When successive workpieces are being handled, the driving elements (e.g., dogs 27) are preferably kept in continuous motion in the feeding direction as by means of an endless chain 26 to which the driving element are connected, and a feeding translation of a workpiece is initiated by effecting relative vertically converging motion between the driving elements and the force applying means to bring them into clampwise engagement with the workpiece. With reference to the specific apparatus illustrated in FIGS. 1—5, the vertically converging relative motion is effected by first lowering the rollers 42 into engagement with the top surface of the workpiece as it is resting on the supporting surfaces 11, 12, and then raising the operative stretch of the chain 26 that carries the dogs 27 to lift the dogs into engagement with the workpiece and, through them, lift the workpiece off of the supporting surfaces 11, 12, simultaneously raising the rollers against yielding downward force exerted upon them.

It will be evident that with this method the driving elements 27 grip the workpiece very securely, owing to their localized engagement with it and to the fact that they remain in fixed relation to the workpiece all during the time they are engaged with it, while the force applying means comprising the rollers 42 maintain secure engagement between the workpiece and the driving elements and also, by reason of their locations relative to the driving elements, steady the workpiece against tilting about the line through the points of engagement between the workpiece and the driving elements. Thus, form the instant the driving elements engage the workpiece, they cooperate with the force applying means to constrain the workpiece to translation in the direction of movement of the driving elements.

Turning now to a more detailed consideration of the structure by which this method is implemented in the particular apparatus herein illustrated, a chain transmission 22 comprises the chain 26 and the driving elements or dogs 27 connected thereto, together with a drive sprocket 23 and a driven or idler sprocket 25 around which the chain 26 is trained. The drive sprocket 23 is secured to a horizontal driving shaft 24 that is connected with a suitable drive motor (not shown). The sprockets 23 and 25 are located near the opposite ends of the orienting station and are thus spaced from one another to define an upper stretch $26_d$, of the chain which entends in the direction of feed. The chain 26 is of such length in relation to the distance between the sprockets 23, 25 that it fits around the sprockets with substantial slack, for a reason which will appear as the description proceeds.

The chain 26 is preferably a roller chain of the so-called duplex type, and the dogs 27 are arranged at regular intervals along it, the distance between adjacent dogs being less than the length of the shortest workpiece to be handled. Each dog 27 comprises a U-shaped bracket 28 that has its leg portions secured, as by welding, to a pair of opposite outer links 29 of the chain, and also comprises a narrow block 30 that is rigidly secured to the bight portion of the bracket to project outwardly from the chain orbit. Each of the blocks 30 is preferably made of hardened steel and has a serrated outer workpiece-engaging face. Thus, when a workpiece is forced against two or more of the blocks 30 along the length of the upper or driving stretch $26_{dr}$ of the chain, the serrated faces of those blocks, being of limited area, will engage the workpiece in a manner to insure good frictional driving of the workpiece by the blocks and to confine the workpiece against any horizontal movement relative to the blocks, even though the engaged face surface of the workpiece is twisted or is otherwise not truly flat.

The upper driving stretch $26_{dr}$ of the chain is supported on a stiff, straight beam 31, preferably having a box-shaped cross-section, which extends along a substantially major part of the distance between the sprockets 23 and 25. Extending along the top surface of the supporting beam 31 is the guide track 33 which cooperates with the upper stretch $26_{dr}$ of the chain to constrain the same to straight-line motion in the feed direction. As shown, the guide track has a V-shaped cross-section, with rather wide surfaces 34 on the tops of its upwardly projecting legs, upon which the chain rollers ride, and opposite outwardly facing side surfaces 35 which are engaged by opposite chain links and confine them against lateral motion. The guide surfaces 34 and 35 of the guide track 33 preferably extend uninterruptedly along the full length of the supporting beam 31. Suitably the guide track can be made of wear-resistant low-friction material such as Delrin and can be secured to the supporting beam by screw joints or other fasteners at intervals along its length.

At this point it should be observed that the sprockets 23 and 25 and the guide track 33 are so located and oriented as to be centered with respect to the slot 13 between the supporting surfaces 11, 12; that is, the vertical plane of symmetry through the several dogs 27 on the upper driving stretch $26_{dr}$ of the chain lies midway between the longitudinal edges of the slot 13. It should also be observed that the width of the workpiece driving blocks 30, as measured transversely to the driving stretch $26_{dr}$ is less than the width of the slot 13.

Normally the chain stretch $26_{dr}$ is at such an elevation that the blocks 30 are wholly below the plane of the supporting surfaces 11, 12, clear of a workpiece resting upon those surfaces, as seen in FIGS. 2-4. However, the blocks 30 can be engaged against a workpiece on the supporting surfaces 11, 12, and can lift and transport that workpiece, in consequence of upward translatory motion of the supporting beam 31; and such lifting of the supporting beam — and with it the upper stretch $26_{dr}$ of the chain — is made possible by the substantial slack with which the chain 26 is trained around the sprockets 23, 25, as mentioned hereinabove. As the driving stretch is lifted, the blocks 30 of course project up through the slot 13 to engage the workpiece.

To provide for lifting and lowering of the supporting beam 31 at proper times, that beam is suspended by means of two pairs of leaf springs 36 (see FIG. 1), one pair near each end thereof, the leaf springs of each pair being located at opposite sides of the beam. Each leaf spring has an upper end secured to a bracket 37 on its side of the beam, and has a lower end secured to a fixed suspension point 38 on the machine frame. The several leaf springs extend substantially parallel to one another, each at an angle of about 45° to the length of the beam 31 so that the leaf springs are flexed by upward and downward displacement of that beam and cooperate to constrain the beam to translatory up and down motion.

The vertical position of the supporting beam is controlled by means of a cylinder actuator 39 that has its opposite end portions connected to the underside of the beam and to a fixed support 40 on the machine frame. These connections of the cylinder actuator 39 are so located that its axis is substantially on the vertical plane of symmetry through the driving blocks 30 and is at an angle of about 45° to the length of the beam but inclined oppositely to the leaf springs. The cylinder actuator 39 is preferably operated by compressed air so that it responds quickly, and at the respective limits of its retraction and extension it disposes the beam 31 in either a lowered inactive position (shown in FIGS. 1-4), in which the dogs 27 are spaced beneath a workpiece resting on the supporting surfaces 11, 12, or in a raised active position (shown in FIG. 5), in which the beam 31 is at an elevation high enough for the dogs 27 to support a workpiece at a small elevation above the surfaces 11, 12. With the beam 31 in its active position and the dogs 27 moving along the narrow linear zone 41 to which they are confined by the guide track 33, the dogs exert a force $P_{dr}$ upon the workpiece in the direction of feed and, with the cooperation of rollers 42, confine the workpiece against displacement in all other directions.

Figure 1:
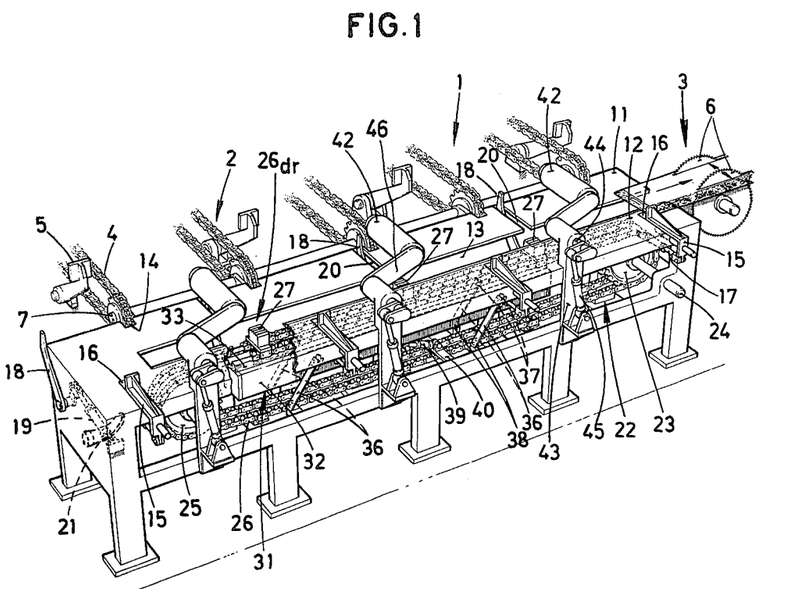
FIG. 1 is a perspective view (with portions shown broken away) of infeed apparatus embodying the principles of this invention, by which cants and similar workpieces are fed with a purely translatory motion from an orienting station to a trimming station.

The rollers 42 are of course freely rotatable on horizontal axes that extend transversely to the stretch $26_{dr}$ and are spaced at intervals along the feed path. As shown in FIG. 1, the rollers are carried on posts 43 which project up from the machine frame at the side thereof remote from the conveyor 2. In the top of each post is journaled a pivot shaft 44 which has its axis parallel to that of the rollers and which has a laterally projecting arm 46 secured to its end nearer the conveyor 2. A roller 42 is freely rotatably journaled on the outer end of each of the arms 42 and extends across the slot 13 and a substantial distance across each of the supporting surfaces 11, 12. It will be evident that upon rotation of the pivot shaft 44 to impart swinging motion to the arm 46, the roller 42 that is carried thereby is raised or lowered. Such rotation is imparted to the pivot shaft 44 by means of an actuator 45 having an eccentric connection to the opposite end of the pivot shaft 44 and reacting against a stationary part of the machine frame.

The actuators 45 for the several rollers 42 are operated in unison and swing the rollers down into engagement with a workpiece at the orienting station just before the supporting beam 31 is raised to engage the dogs 27 against the workpiece, as can be seen from the sequence of operations depicted in FIGS. 3-5. The actuators 45 are preferably air-operated or are otherwise arranged to maintain a yielding downward force upon the rollers 42 so that as the beam 31 is raised, the rollers 42 and the dogs 27 cooperate to maintain the workpiece clamped between them.

Although the rollers 42 are shown as cylindrical, each roller could comprises a plurality of coaxial wheels or axially short roller elements, all of like diameter and preferably at close axial spacings relative to one another. Of course it is important that every roller have substantial axial extent, so as to have portions well spaced to laterally opposite sides of the narrow longitudinally central zone of the workpiece that is engaged by the driving elements, to confine the workpiece against lateral tilting.

Figure 7:
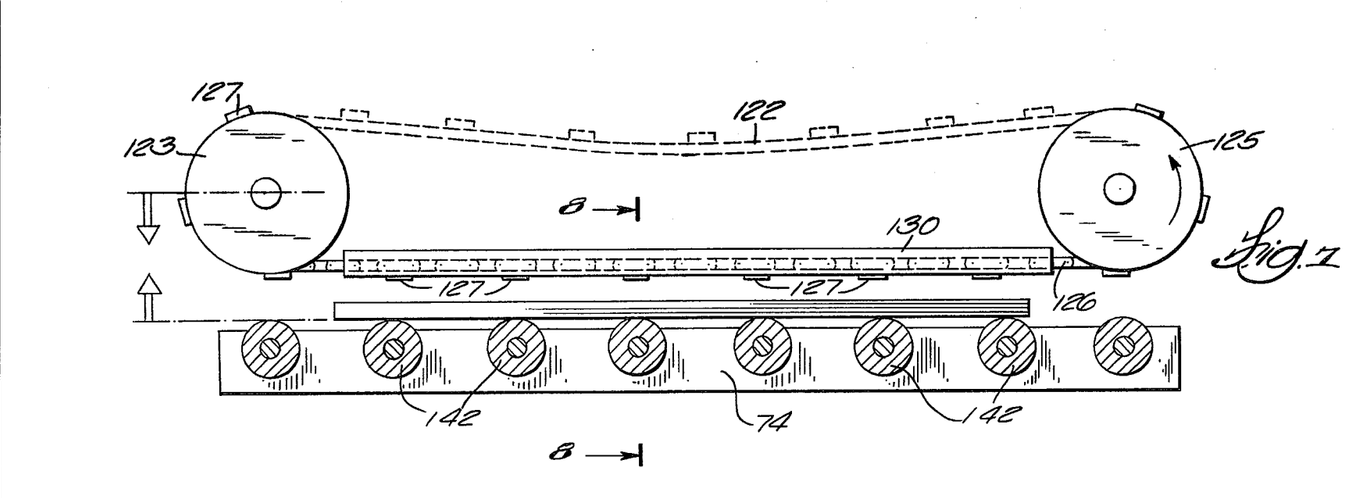
FIG. 7 is a more or less diagrammatic and fragmentary view in elevation of a modified embodiment of the invention.
Figure 8:
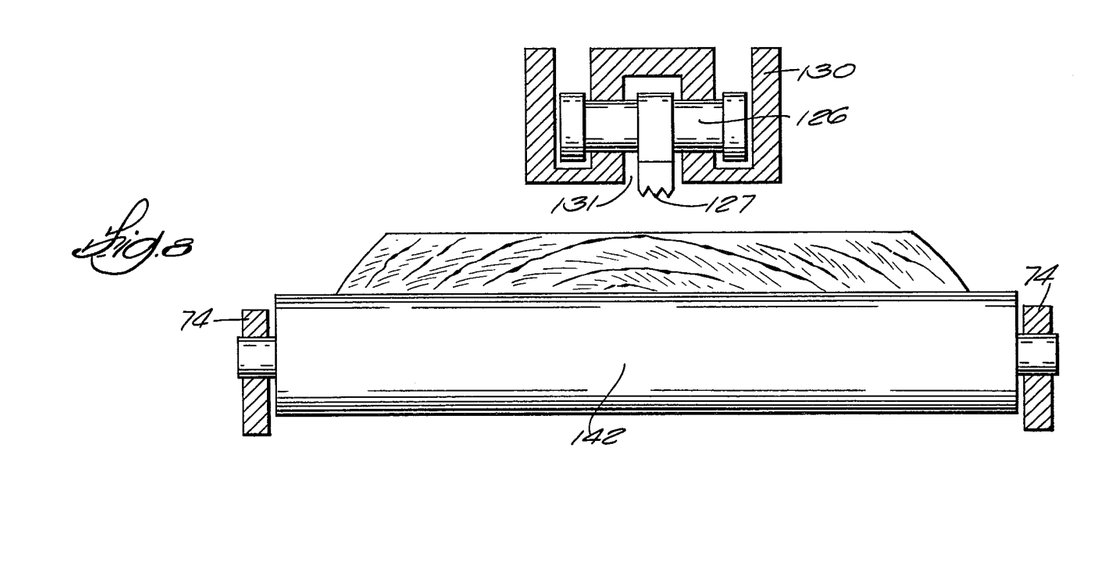
FIG. 8 is a view in cross-section taken on the plane of the line 8—8 in FIG. 7.

In the embodiment of the invention that is illustrated more or less diagrammatically in FIGS. 7 and 8, the rollers 42' are again freely rotatable on horizontal axes that extend transversely to the direction of feed between the orienting station and the trimming station, but in this case the several rollers 42', in addition to serving as force applying means, cooperate to provide upwardly facing surface portions comparable to those identified by the numerals 11 and 12 in FIGS. 1–6, upon which a workpiece rests at the orienting station. The several rollers 42' are rotatable journalled on a common carriage 74. The chain 122 that carries the dogs 127 which translatingly propel the workpiece along the feed path is located wholly above that feed path.

The lower stretch 126 of the chain 122, which is in this case its driving stretch, rides in a guide track 130. As shown in FIG. 8, the guide track is of such cross sectional configuration that coacting lengthwise extending surfaces thereof so engage the rollers of the chain that the stretch 126 is confined to straight-line motion in the feeding direction. The dogs 127 that engage the workpiece project downwardly through a slot 131 in the bottom of the guide track.

Since the workpiece in the FIGS. 7 and 8 embodiment is supported on the rollers 42' during its orientation, feeding transport of the workpiece is initiated by merely effecting relative vertically convergent motion between the rollers 42' as a group and the lower chain stretch 126. This can be accomplished by moving the common carriage 74 with a vertical translatory motion, in which case the guide track 130 would be secured against displacement from a fixed elevation. Alternatively, the guide track along which the chain stretch 126 travels could be movable up and down relative to its sprockets 123, 125 and relative to the rollers 142, in an obvious adaptation of the structure disclosed in FIG. 1. As another obvious alternative, the sprockets 123, 125 and the guide track 130 could all be mounted on a frame arranged to be translated up and down, the chain then being trained around its sprockets with a normal tension that would be maintained at all times.

From the foregoing description taken with the accompanying drawings it will be apparent that this invention provides a method and means for effecting purely translatory feeding motion of lumber workpieces from an orienting station to an edge trimming station, and thereby assures that the edge trimming cuts which are intended to be made on the workpiece, and for which it is oriented at the orienting station, will be accomplished accurately at the trimming station.

Those skilled in the art will appreciate that the invention can be embodied in forms other than as herein disclosed for purposes of illustration.

The invention is defined by the following claims:

1. The method of effecting translatory substantially lengthwise motion of an elongated workpiece such as a cant or a slab that has opposite top and bottom face surfaces, at least one of which is substantially flat, to feed the workpiece in a horizontal direction from an orienting station at which the workpiece is established in a predetermined orientation with its said one face surface substantially horizontal, into a cutting station at which straight and parallel cuts transverse to said one face surface are made along the length of the workpiece while its predetermined orientation is accurately maintained notwithstanding cutting forces which tend to disturb that orientation, said method being characterized by:

A. establishing the workpiece, in its said orientation, in vertical force transmitting relationship to force applying means by which said one face surface of the workpiece is engaged across the major portion of its width at each of a plurality of locations spaced along its length, and by which the workpiece can be confined against vertical motion in the direction of its said one face surface while being left free for movement in said horizontal direction;

B. while maintaining said force transmitting relationship, and by effecting translatory vertical relative motion between said force applying means and horizontally movable driving means, establishing forceful engagement between said driving means and a plurality of areas of the opposite face surface of the workpiece at locations thereon which are confined to a narrow lengthwise extending central zone of said other face surface, are spaced from one another along said zone, and are of such limited extent that the driving means is incapable of preventing tilting of the workpiece without cooperation of the force applying means but, owing to said forceful engagement, has sufficient friction with the workpiece that the workpiece is constrained to partake of all motion of the driving means; and C. while maintaining the workpiece clampingly confined between the force applying means and the driving means, constraining the driving means to straight-line horizontal motion in said direction.

2. The method of claim 1, wherein the workpiece is stationarily supported in said orientation on means at said orienting station that provide coplanar upwardly facing surface areas at laterally opposite sides of the line of horizontal motion to which the driving means is confined, further characterized by:

(1) establishing the workpiece in force transmitting relationship to the force applying means by translating the force applying means in a downward direction, to clampingly confine the workpiece against said upwardly facing surface areas; and (2) thereafter, and with the driving means moving in said horizontal direction, translating the driving means upwardly a sufficient distance for the driving means to engage the workpiece and lift it out of engagement with said surface areas, so that the workpiece is then subjected only to vertical clamping force and the horizontal force applied to it by the driving means.

3. Apparatus by which translatory substantially lengthwise horizontal motion in one direction can be imparted to a cant or similar elongated workpiece that has opposite top and bottom face surfaces, at least one of which is flat, to feed the workpiece from an orienting station towards a cutting station at which straight and parallel cuts transverse to said one face surface are made along the length of the workpiece, said apparatus being characterized by:

A. a plurality of workpiece driving elements, each having a workpiece engaging surface which is of such small area as to permit substantially free tilting of a workpiece with which it is engaged but to be engageable under force against one of said face surfaces on the workpiece with a friction high enough to prevent sliding of the workpiece relative to the driving element;

B. drive means for driving elements constraining them to straight line motion in said direction along a defined narrow path and by which the driving elements are constrained to traverse said path
  (1) in lengthwise spaced relation to one another,
  (2) at like speeds and
  (3) with their said surfaces coplanar and facing in one vertical direction;

C. force applying means
  (1) mounted to be freely revolvable about horizontal axes which
    (a) extend transversely to said path and
    (b) are spaced from one another along the length thereof,
  (2) said force applying means being normally spaced in said one vertical direction from said surfaces on the driving elements and
  (3) having portions nearest the plane of said surfaces on the driving elements which
    (a) lie in a common plane parallel to and spaced in said one vertical direction from the plane of said surfaces on the driving elements, and
    (b) are arranged for engaging said flat surface of a workpiece across a major portion of its width at each of a plurality of locations along its length;

D. means at the orienting station for establishing a workpiece in a predetermined orientation and with its longitudinal centerline substantially coinciding with said narrow path; and E. means for effecting relative translatory vertical motion between said drive means and said force applying means, to cause driving elements to engage the other face surface of a workpiece at the orienting station and the force applying means to engage said one face surface thereof, said means for effecting relative translatory vertical motion being so arranged that
  (1) the driving elements engage a workpiece after the force applying means is engaged therewith, and
  (2) the force applying means remains engaged with the workpiece as long as driving elements are engaged therewith,
  so that the force applying means confines the workpiece in engagement with the driving elements to prevent relative motion between the workpiece and the driving elements and steadies the workpiece against lateral tilting.

4. Apparatus by which translatory substantially lengthwise horizontal motion in one direction can be imparted to a cant or similar elongated workpiece that has opposite top and bottom face surfaces, at least one of which is flat, to feed the workpiece from an orienting station towards a cutting station at which straight and parallel cuts transverse to said face surfaces are made along the length of the workpiece, said apparatus being characterized by:

A. an endless orbitally moving drive member having dog-like driving elements at spaced intervals therearound, each of said driving elements projecting outwardly from the orbit of the drive member and having an outer workpiece engaging surfce which is of small area and is frictionally engageable with a workpiece;

B. guide means cooperating with a stretch of the drive member to confine the driving elements thereon to rectilinear motion along a narrow path lying in a vertical plane extending in said direction;

C. means at said orienting station for establishing a workpiece in a predetermined orientation with its longitudinal centerline substantially coinciding with said narrow path and its said one face surface horizontal;

D. roller means freely rotatable on horizontal axes which extend transversely to said vertical plane,
  (1) said roller means having surface portions which are tangent to a common horizontal plane and which extend substantial distances to opposite sides of said vertical plane and are arranged for engaging said flat surface of a workpiece across a major portion of its width, and
  (2) said roller means being spaced from one another along said path to engage the workpiece at spaced locations along its length; and E. convergence means for effecting translatory vertically converging relative motion between said guide means and said roller means.
  (1) said convergence means being arranged to effect engagement of driving elements on said stretch of the drive member against the other face of a workpiece established at the orienting station after said one face surface of the workpiece is engaged with said roller means, so that the roller means can support the workpiece against the vertical force of engagement of the driving elements against it, and
  (2) said convergence means being further arranged to maintain the workpiece confined vertically between the driving elements and the roller means as long as driving elements remain engaged with the workpiece, so that the roller means constrain the workpiece to translatory motion with the driving elements in said stretch and steady the workpiece against lateral tilting.

5. The apparatus of claim 4 wherein said stretch of the drive member is an upper stretch thereof, wherein said roller means are located above said upper stretch, and wherein said means for establishing a workpiece in said predetermined orientation at said orienting station comprises stationary means defining upwardly facing workpiece supporting surfaces separated by a slot that corresponds to said path, further characterized by:
  (1) said roller means being translatable downwardly in unison to engage the upper face surface of a workpiece on said supporting surfaces, and being arranged to exert a yielding downward force upon a workpiece engaged by them; and
  (2) said guide means being translatable upwardly to cause the driving elements on said stretch to engage a workpiece through said slot and to lift the workpiece off of said supporting surfaces against said yielding downward force exerted by the roller means.

6. The apparatus of claim 4 wherein said stretch of the drive chain is a lower stretch thereof, wherein said roller means are located below said lower stretch, and wherein said roller means are arranged for supporting a workpiece at the orienting station in its said orientation.

7. Apparatus for effecting translatory substantially lengthwise horizontal motion in one direction of elongated lumber workpieces such as cants or slabs, each having a flat bottom surface that extends lengthwise and widthwise of the workpiece, and an opposite top surface, to cause each workpiece to be fed from an orienting station towards a cutting station at which straight and parallel substantially vertical cuts are made along the length of the workpiece, said apparatus being characterized by:

A. stationary workpiece supporting means at the orienting station providing coplanar upwardly facing supporting surfaces separated by a narrow slot that extends lengthwise in said horizontal direction;

B. means at the orienting station cooperating with said workpiece supporting means for establishing a workpiece on said supporting means
  (1) with its flat bottom surface resting on said supporting surfaces,
  (2) with the workpiece so bridging said slot that the longitudinal centerline of the slot approximately coincides with that of the workpiece, but
  (3) with the workpiece in an orientation estimated to be optimum for its feed through the trimming station;

C. a drive transmission comprising an endless orbitally movable drive member with an upper stretch that has its longitudinal centerline contained in a common vertical plane with that of the slot;

D. a plurality of dog-like drive elements on said drive member, at spaced intervals therealong, each of said drive elements
  (1) projecting outwardly from the orbit of the drive member,
  (2) having an outer surface frictionally engageable with the bottom surface of a workpiece, and
  (3) being narrower said slot as measured transversely thereto;

E. guide means cooperating with said stretch of the drive member to constrain the same to
  (1) straight-line motion in said horizontal direction and
  (2) to vertical substantially translatory motion whereby said stretch is carried between
    (a) an inactive position in which said outer surfaces of the drive elements on said stretch are spaced below the plane of said supporting surfaces and
    (b) an active position in which the drive elements project through said slot to have their said outer surfaces above the last mentioned plane;

F. a plurality of rollers freely rotatable on fixed horizontal axes that extend transversely to said centerline of the slot and are spaced from one another in said horizontal direction, said rollers normally being spaced above the plane of said supporting surfaces and each of said rollers having portions extending axially to opposite sides of said vertical plane;

G. means for lowering said rollers in unison to engage them with yielding downward force against the upper surface of a workpiece at the orienting station; and H. means for raising the guide means from its inactive position to its active position after the rollers are engaged with a workpiece at the orienting station, so that the drive elements on said stretch can engage the bottom surface of a workpiece through said slot, lift the workpiece off of said supporting surface and constrain the workpiece to translatory motion in said horizontal direction while the rollers confine the workpiece in engagement with the drive elements and steady the workpiece against lateral tilting.

8. The apparatus of claim 7 wherein said means at the orienting station for establishing each workpiece in said orientation comprises orienting stops projecting upwardly from said coplanar surfaces, spaced laterally to one side of the slot and spaced apart lengthwise of the slot, and means for sliding each workpiece across said surfaces transversely to its length and in a direction transverse to said slot, from the other side of the slot and across the slot into engagement with the orienting stops, further characterized by:

said stationary workpiece supporting means having a chamfered edge portion along the slot at the first mentioned side thereof, to enable a workpiece to be slid readily across the slot without catching therein.

* * * * *